(12) United States Patent
Yamasaki et al.

(10) Patent No.: US 9,771,987 B2
(45) Date of Patent: Sep. 26, 2017

(54) DISK BRAKE

(71) Applicant: HITACHI AUTOMOTIVE SYSTEMS, LTD., Ibaraki (JP)

(72) Inventors: Suguru Yamasaki, Minami Alps (JP); Shinji Suzuki, Minami Alps (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 57 days.

(21) Appl. No.: 14/832,104

(22) Filed: Aug. 21, 2015

(65) Prior Publication Data

US 2016/0069403 A1 Mar. 10, 2016

(30) Foreign Application Priority Data

Sep. 8, 2014 (JP) ................................. 2014-182327

(51) Int. Cl.
| | |
|---|---|
| *F16D 55/226* | (2006.01) |
| *F16D 65/18* | (2006.01) |
| *F16D 55/00* | (2006.01) |
| *F16D 121/24* | (2012.01) |
| *F16D 121/04* | (2012.01) |
| *F16D 123/00* | (2012.01) |

(52) U.S. Cl.
CPC .......... *F16D 55/226* (2013.01); *F16D 65/18* (2013.01); *F16D 2055/0016* (2013.01); *F16D 2055/0075* (2013.01); *F16D 2121/04* (2013.01); *F16D 2121/24* (2013.01); *F16D 2123/00* (2013.01)

(58) Field of Classification Search
CPC . F16D 55/226; F16D 65/18; F16D 2055/0016
See application file for complete search history.

(56) References Cited

U.S. PATENT DOCUMENTS

| | | | | |
|---|---|---|---|---|
| 8,790,208 | B2* | 7/2014 | Poertzgen | B60T 13/741 475/149 |
| 8,905,201 | B2* | 12/2014 | Laubenthal | F16D 55/22655 188/72.6 |
| 9,145,939 | B2* | 9/2015 | Giering | F16D 65/0006 |
| 2003/0083797 | A1* | 5/2003 | Yokoyama | B60T 13/741 701/70 |
| 2008/0283345 | A1* | 11/2008 | Balz | F16D 65/18 188/72.6 |

(Continued)

FOREIGN PATENT DOCUMENTS

JP 2014-29193 2/2014

*Primary Examiner* — Vishal Sahni
(74) *Attorney, Agent, or Firm* — Wenderoth, Lind & Ponack, L.L.P.

(57) ABSTRACT

A disk brake includes a caliper, and a driving unit disposed in a housing attached to the caliper. An attachment portion used to attach the housing to the caliper and a connector used to supply power to the electric motor are protrudingly provided at the housing. The attachment portion is formed in such a manner that a distance between a center of the disk rotor and a portion of the attachment portion located farthest away from the center of the disk rotor in a radial direction is longer than a distance between the center of the disk rotor and a portion of the connector located farthest away from the center of the disk rotor in the radial direction, and a width of the connector in an axial direction of the disk rotor falls within a range of a width of the attachment portion in the axial direction.

18 Claims, 7 Drawing Sheets

(56) References Cited

U.S. PATENT DOCUMENTS

2011/0127121 A1\* 6/2011 Laubenthal ....... F16D 55/22655
  188/72.3
2014/0034430 A1\* 2/2014 Fuse ................... F16D 55/226
  188/72.4

\* cited by examiner

DISK BRAKE

TECHNICAL FIELD

The present invention relates to a disk brake.

BACKGROUND ART

One conventionally known type of disk brake including a connector is a disk brake of a vehicle that includes an electric parking brake mechanism installed in a caliper, as discussed in, for example, Japanese Patent Application Public Disclosure No. 2014-29193. The parking brake mechanism is configured to be able to maintain a braked state even after a stop of power supply to an electric motor, after displacing a piston forward by the electric motor to press brake pads against a disk rotor to thereby establish the braked state.

SUMMARY

The following problem lies with the technique discussed in Japanese Patent Application Public Disclosure No. 2014-29193. The caliper of the disk brake includes a connector for connecting a lead wire (a cable) used to supply power to the electric motor of the parking brake mechanism. The caliper of the disk brake is mounted in a wheel of the vehicle so as to extend over the disk rotor with a narrow limited clearance generated between an inner circumferential surface of the wheel and the caliper. Therefore, in winter, a part of the caliper may contact ice and snow stuck to the inner circumferential surface of the wheel, which may cause trouble with as operation of a driving unit of the parking brake mechanism.

According to an aspect of the present invention, a disk brake includes brake pads disposed opposite of a disk rotor from each other on both sides of the disk rotor, a caliper including a piston configured to press the brake pads against the disk rotor and a driving mechanism configured to drive the piston, and a driving unit disposed in a housing attached to the caliper and including an electric motor and a transmission mechanism configured to transmit a driving force of the electric motor to the driving mechanism. An attachment portion and a connector are protrudingly provided at the housing. The attachment portion is used to attach the housing to the caliper, and the connector is used to supply power to the electric motor. The attachment portion is formed in such a manner that a distance between a center of the disk rotor and a portion of the attachment portion that is located farthest away from the center of the disk rotor in a radial direction is longer than a distance between the center of the disk rotor and a portion of the connector that is located farthest away from the center of the disk rotor in the radial direction, and that a width of the connector in an axial direction of the disk rotor fails within a range of a width of the attachment portion in the axial direction of the disk rotor.

DESCRIPTION OF EMBODIMENTS

In the following description, an embodiment of the present invention will be described in detail with reference to the drawings. As illustrated in FIGS. 1 to 9, a disk brake 1 according to the present embodiment is a floating caliper-type disk brake including a parking brake mechanism installed therein. This disk brake 1 includes a disk rotor D (refer to FIG. 10) rotatable together with a wheel, a carrier 2 fixed to a vehicle body side, a caliper 3 supported by the carrier 2 in a floating manner, and a pair of brake pads 4 and 5 disposed on both sides of the disk rotor D and supported by the carrier 2. The disk rotor D rotates in such a direction that an entry side and an exit side in the rotational direction thereof would be located on a left side and a right side as viewed in FIG. 10, respectively, when a vehicle is advanced.

The carrier 2 includes support portions 6 and 7 disposed opposite of the disk rotor D from each other on both sides of the disk rotor D, and coupled with each other. The support portion 6 is disposed on an inner side of a vehicle body with respect to the disk rotor D, and the support portion 7 is disposed on an outer side of the vehicle body with respect to the disk rotor D. The pair of brake pads 4 and 5 is supported by these support portions 6 and 7, respectively. Mounting portions 8 are formed on both sides of the support portion 6. Generally, the carrier 2 is fixed to the vehicle body side by screwed fixation of the attachment portions 8 to a member on the vehicle body side such as a knuckle, which is a non-rotational portion of the vehicle, with use of a bolt or the like. The support portions 6 and 7 receive a braking torque applied to the brake pads 4 and 5 by torque receiving surfaces formed on inner surfaces thereof that face the disk rotor D. Further, the brake pads 4 and 5 are engaged with guide portions formed on torque receiving surfaces of the carrier 2, and are guided movably forward toward and rearward away from frictional surfaces of the disk rotor D.

The caliper 3 includes a generally cylindrical main body portion 3A, a bridge portion 3C, and a claw portion 3B. The main body portion 3A includes s cylinder bore 9 (refer to FIG. 9) that faces the brake pad 4, which is one of the brake pads. The bridge portion 3C extends from the main body portion 3A over the disk rotor D. The claw portion 3B extends from the bridge portion 3C inwardly in a radial direction of the disk rotor D, and faces the brake pad 5, which is the other of the brake pads. The main body portion 3A, the bridge portion 3C, and the claw portion 38 are integrally formed. A piston 10 (refer to FIG. 9) is inserted in the cylinder bore 9. A hydraulic port 11 (refer to FIG. 5), which is in communication with the cylinder bore 9, is provided at the main body portion 3A of the caliper 3. The piston 10 is displaced forward by supply of brake fluid into the cylinder bore 9 via the hydraulic port 11. A bleed plug 12 is attached at the main body potion 3A in a hole that would be in communication with an uppermost portion of the cylinder bore 9 when the caliper 3 is mounted on the vehicle. A pair of slide pins 13A and 14A is attached at arm portions 13 and 14 formed on both sides of the main body portion 3A by, for example, threaded fixation. These slide pins 13A and 14A are slidably inserted in guide portions 15 and 16 provided on both sides of the carrier 2. By this configuration, the caliper 3 is supported in a floating manner, movably in an axial direction of the disk rotor D.

A parking brake mechanism 17 (refer to FIG. 9) is built in the main body portion 3A of the caliper 3 as a driving mechanism that drives the piston 10. The parking brake mechanism 17 includes a rotation-linear motion conversion mechanism (for example, a ball-ramp mechanism, a ball-screw mechanism, or the like), a clutch mechanism, and the like. The parking brake mechanism 17 can convert a rotational motion generated by an electric motor 18 into a linear motion to thereby displace the piston 10 forward, and after that, hold the piston 10 as a position to which the piston 10 is displaced forward even after a step of the electric motor 18.

A driving unit 20 is attached at an end of the main body portion 3A of the caliper 3 that is located opposite from the cylinder bore 9, i.e., located on a bottom side of the bottomed cylindrical shape of the main body portion 3A. The driving unit 20 includes the electric motor 13 that drives the parking brake mechanism 17, and a speed reducer 19. The driving unit 20 includes a housing 21 shaped so as to have a generally oval end surface. A part of the electric motor 18, and the speed reduce 19 are contained in the housing 21. The driving unit 20 transmits a driving force of the electric motor 18 to the parking brake mechanism 17 in the main body-portion 3A of the caliper 3 via the speed reducer 19. The electric motor 18 is disposed so as to be arranged side by side with the main body portion 3A of the caliper 3, i.e., arranged in such a manner that an axis of the cylinder bore 9 and a rotational axis of the electric motor 18 extend in parallel with each other. The electric motor 18 is coupled with the housing 21 in such a manner that an end of the electric motor 18 on an output shaft side is inserted in one of oval circumferential sides of the housing 21. The speed reduce 19 is a transmission mechanism that transmits the driving force of the electric motor 18 to the parking brake mechanism 17. The speed reducer 19 can be a gear set including a spur gear, a planetary gear, or the like. The speed reducer 19 transmits a rotation of the electric motor 18 to the parking brake mechanism 17 while slowing down this rotation. An output shaft 28 of the speed reducer 18 is disposed on the other of the oval circumferential sides of the housing 21, and is coupled with the parking brake mechanism 17. A connector 22 is provided at the housing 21. The connector 22 is used to connect a lead wire for supplying power from outside to the electric motor 18, and is made of a synthetic resin material. The connector 22 is disposed at a side surface portion on the one (where the electric motor 18 is disposed) of the oval circumferential sides of the housing 21. Cutout portion 23 and 24 are formed at the side surface portion on the one (where the electric motor 18 is disposed) of the oval circumferential sides of the housing 21. The cutout portion 23 has a shape defined by cutting out a portion of the housing 21 that faces the slide pin 14A attached to the arm portion 14, which is one of the arm portions, of the caliper 3. The cutout portion 24 has a shape defined by cutting out a portion of the housing 21 that faces one of the mounting portions 8 of the carrier 2. The driving unit 20 may be configured to contain the entire electric motor 18 in the housing 21.

A pair of attachment portions 25 is formed at the housing 21. The pair of attachment portions 25 protrudes from portions of fiat surfaces of the housing 21 on both sides thereof that are located closer to the speed reducer 19, respectively. Facing this pair of attachment portions 25, a pair of attachment screw portions 26 is formed as boss portions at generally central portions of the main body portion 3A of the caliper 3. Then, the housing 21 is coupled with the caliper 3 with the speed reducer 19 facing the parking brake mechanism 17 and the electric motor 18 disposed in parallel with the side of the main body portion 3A, by insertion of attachment bolts 27 through the attachment portions 25 of the housing 21 and screwed engagement of the attachment bolts 27 into the attachment screw portions 26 of the main body portion 3A of the caliper 3.

Figure 4:
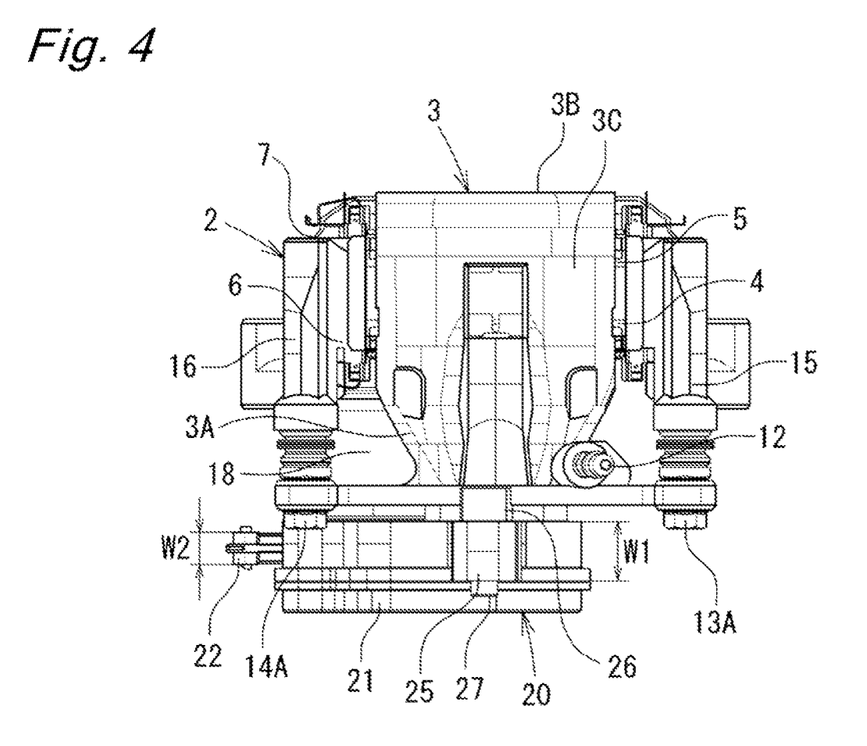
FIG. 4 is a top view of the disk brake illustrated in FIG. 1.
Figure 5:
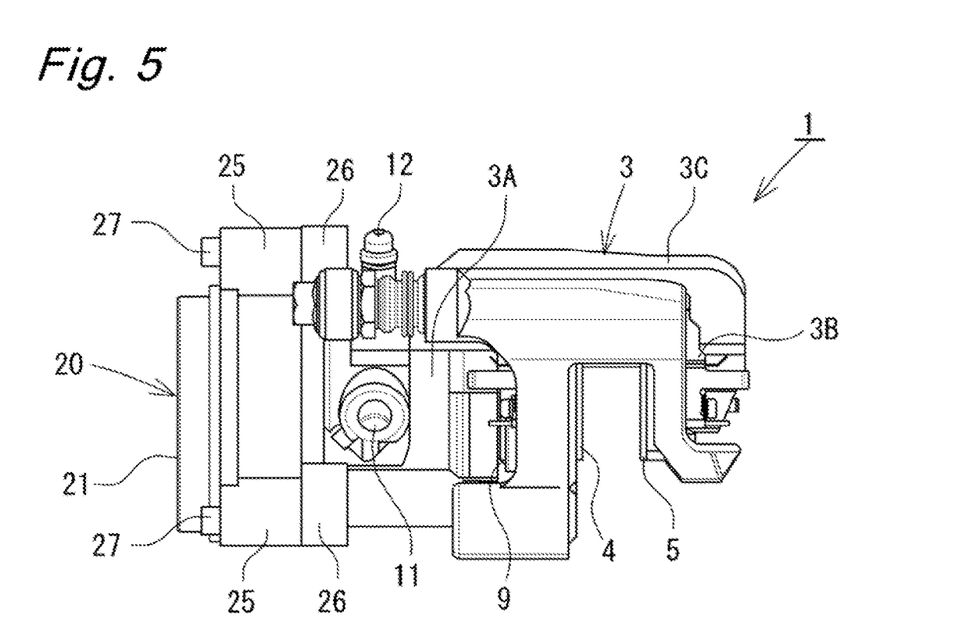
FIG. 5 is a right side view of the disk brake illustrated in FIG. 1.
Figure 6:
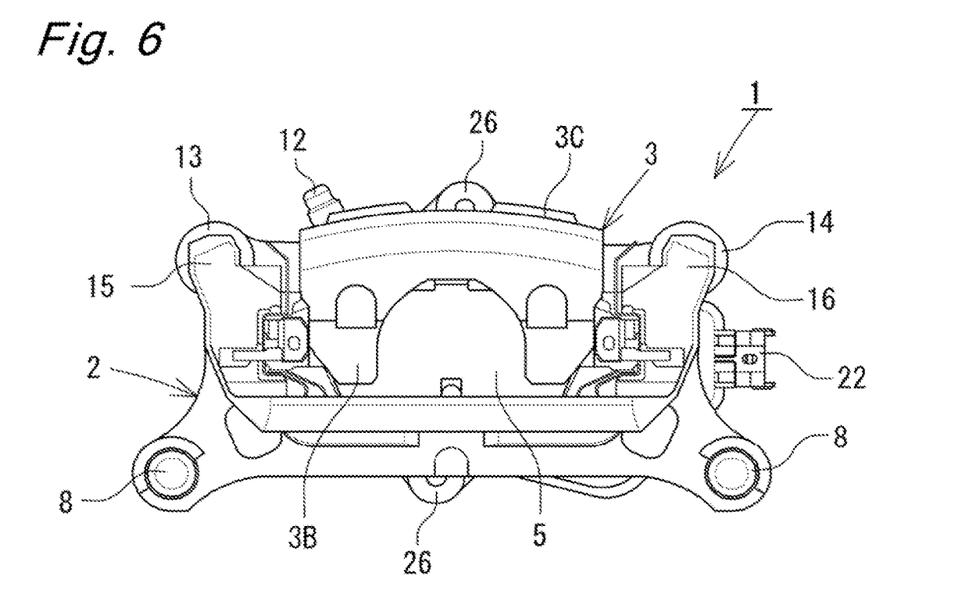
FIG. 6 is a back view of the disk brake illustrated in FIG. 1.
Figure 7:
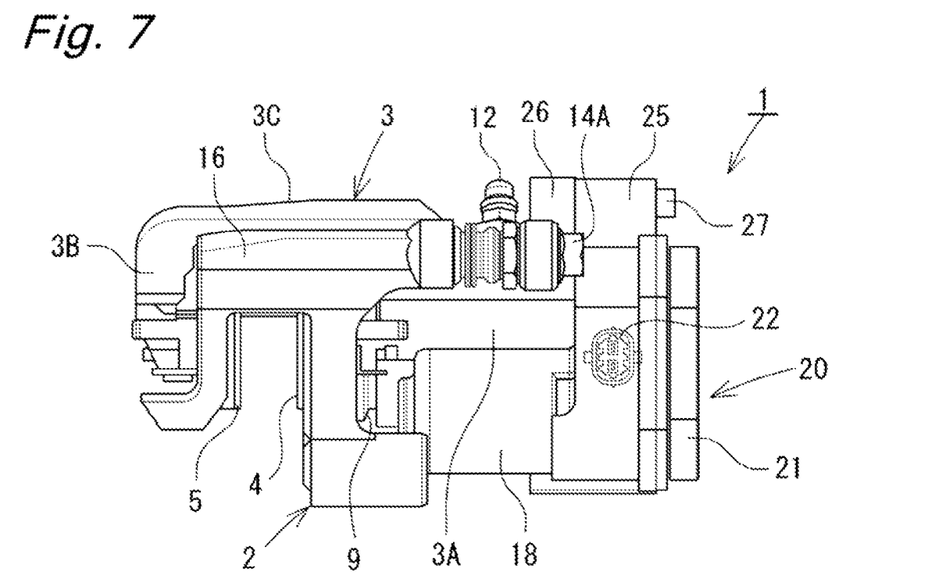
FIG. 7 is a left side view of the disk brake illustrated in FIG. 1.
Figure 8:
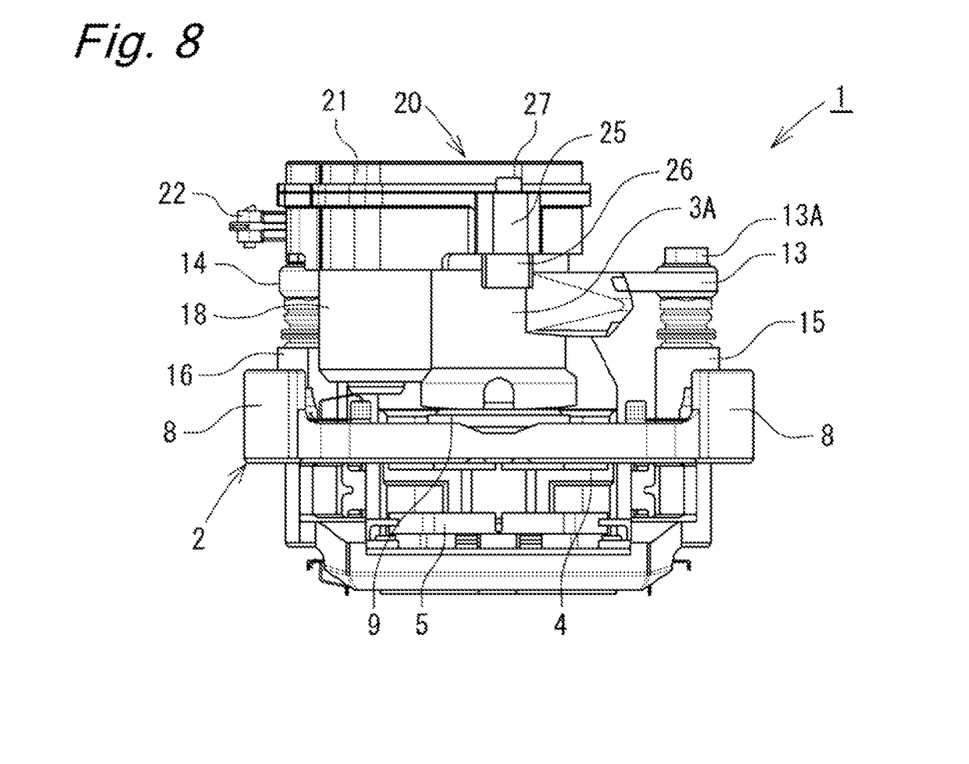
FIG. 8 is a bottom view of the disk brake illustrated in FIG. 1.
Figure 9:
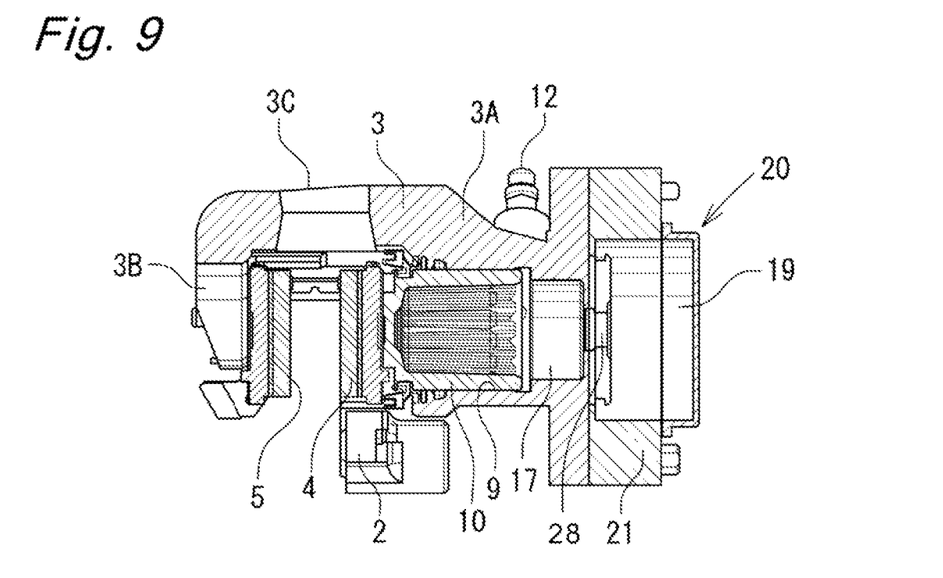
FIG. 9 is a vertical cross-sectional view of the disk brake illustrated in FIG. 1.
Figure 10:
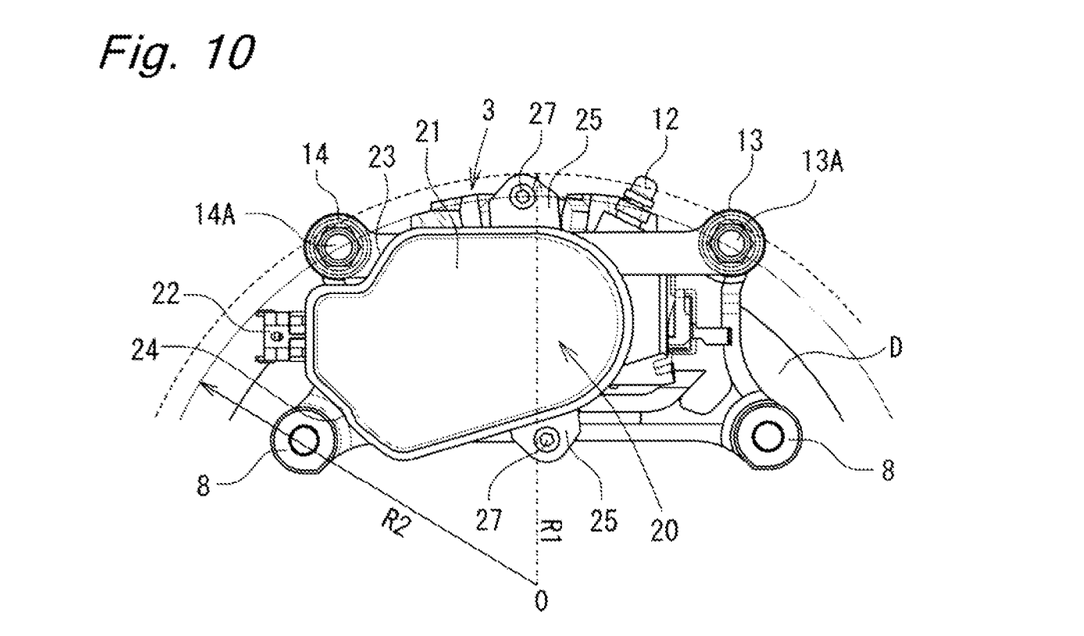
FIG. 10 illustrates a positional relationship between an attachment portion and a connector of a driving unit of the disk brake illustrated in FIG. 1, and a center of the disk rotor.

Next, a relationship between the connector 22 and the attachment portion 25 of the driving unit 20 will be described with reference to mainly FIGS. 4 and 10. The attachment portion 25 and the connector 22 are disposed so as to protrude from the housing 21 while being arranged radially along the rotational direction of the disk rotor D. The attachment portion 25 protrudes from the surface of the housing 21 on an outer side in the radial direction of the disk rotor D. Further, the attachment portion 25 is disposed at the housing 21 so as to radially outwardly protrude from an outermost portion in the radial direction of the disk rotor D. As illustrated in FIG. 10, a distance R1 between a center O of the disk rotor D and a portion of the attachment portion 25 that is located farthest away from the center O of the disk rotor D is longer than a distance R2 between the center O of the disk rotor D and a portion of the connector 22 that is located farthest away from the center O of the disk rotor D. Further, as illustrated in FIG. 4, a width W1 of the attachment portion 25 in the axial direction of the disk rotor D is wider than a width W2 of the connector 22 in the axial direction of the disk rotor D. Then, she connector 22 is disposed in such a manner that the entire width W2 thereof is contained within a range of the width W1 of the attachment portion 25 in the axial direction of the disk rotor D.

An operation of the present embodiment configured in the above-described manner will be described next. Upon supply of the brake fluid from a master cylinder or the like into the cylinder bore 9 via the hydraulic port 11, the piston 10 is displaced forward to thereby press the brake pad 4, which is the one of the brake pads, against the disk rotor D. A reaction force therefrom causes the caliper 3 to be displaced, and thus the claw portion 3B to press the brake pad 5, which is the other of the brake pads, against the disk rotor D. As a result, a braking force is generated. At this time, the carrier 2 supports the brake pads 4 and 5 being dragged by the disk rotor D, thereby receiving the braking torque. Upon a release of the brake hydraulic pressure, the piston 10 is displaced backward, which releases the braking.

Further, the parking brake is applied in the following manner. Upon power supply to the electric motor 18, the electric motor 18 drives the parking brake mechanism 17 via the speed reducer 19, which causes the piston 10 to be displaced forward and thus the brake pads 4 and 5 to be pressed against the disk rotor D in a similar manner to the above-described operation. As a result, a braking force is generated. At this time, the parking brake mechanism 17 holds the piston 10 at the position to which the piston 10 is displaced forward, thereby maintaining the braked state, even after a stop of the power supply to the electric motor. On the other hand, the parking brake is released in the following manner. The electric motor is rotated in a reverse direction, which causes the piston to be displaced backward and thus the brake pads 4 and 5 to be separated from the disk rotor D.

The distance R1 between the center O of the disk rotor D and the portion of the attachment portion 25 that is located farthest away from the center O of the disk rotor D among all portions of the housing 21 of the driving unit 20 is longer than the distance R2 between the center O of the disk rotor D and the portion of the connector 22 that is located farthest away from the center O of the disk rotor D. Further, the width W1 of the attachment portion 25 in the axial direction of the disk rotor D is wider than the width W2 of the connector 22 in the axial direction of the disk rotor D. Further, the connector 22 is disposed in such a manner that the entire width W2 thereof is contained within the range of the width W1 of the attachment portion 25 in the axial direction of the disk rotor D. Due to this configuration, if ice and snow are stuck to an inner surface of the wheel of the vehicle on which the disk brake 1 is mounted, these ice and snow are swept down or scraped off by the attachment portion 25 during a rotation of the wheel, and therefore are unlikely brought into contact with the connector 22. In this manner, the connector 22 can be protected by the attachment portion 25, which eliminates the necessity of additionally preparing a means for protecting the connector 22. In ether words, the connector 22 of the caliper 3 can be unaffected or less affected by the ice and snow stuck to the wheel with one simple configuration.

Next, first to third modifications of the disk brake 1 according to the embodiment illustrated in FIG. 1 will be described with reference to FIGS. 11 to 13. In the following description, similar components to the components illustrated in FIG. 1 will be identified by the same reference numerals, and only features different from FIG. 1 will be described in detail.

Figure 1:
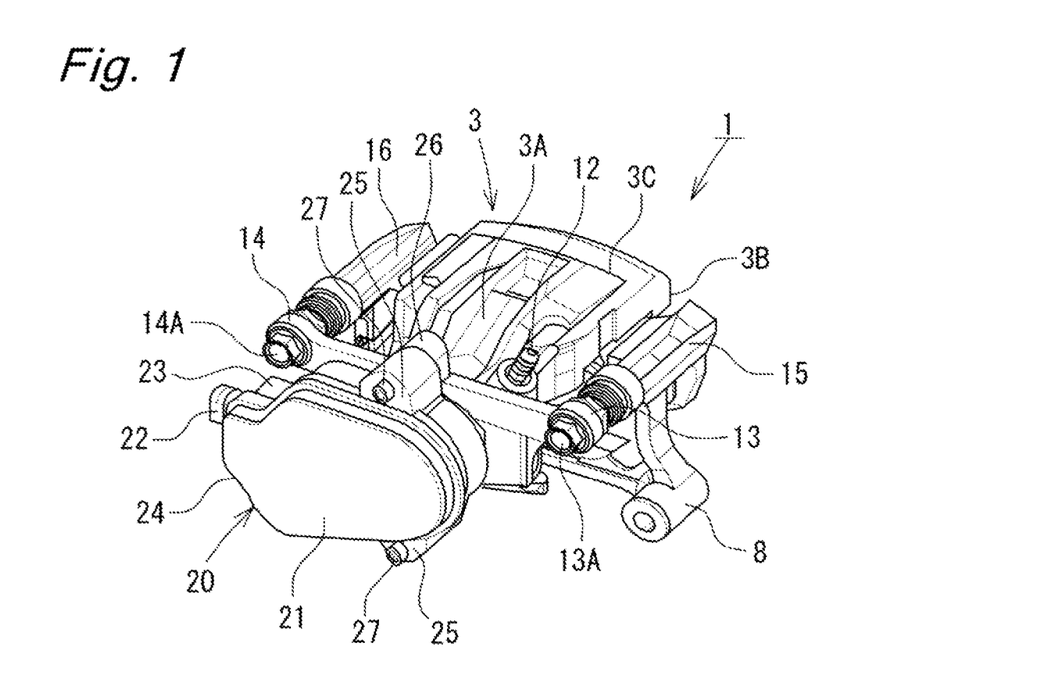
FIG. 1 is a perspective view of a disk brake according to an embodiment of the present invention as viewed from a driving unit side.
Figure 2:
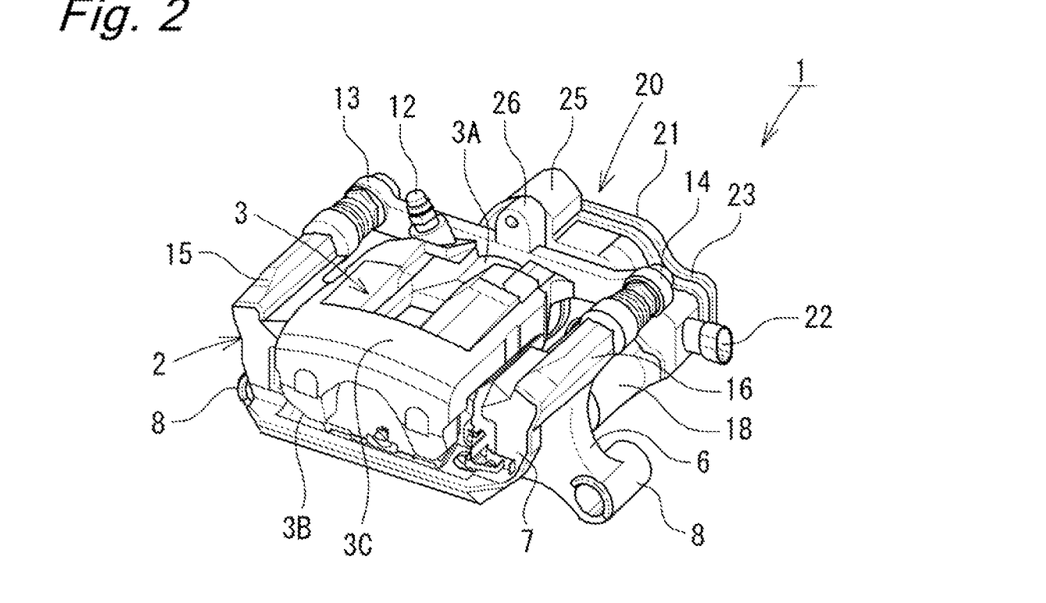
FIG. 2 is a perspective view of the disk brake illustrated in FIG. 1 as viewed from a caliper claw portion side.
Figure 3:
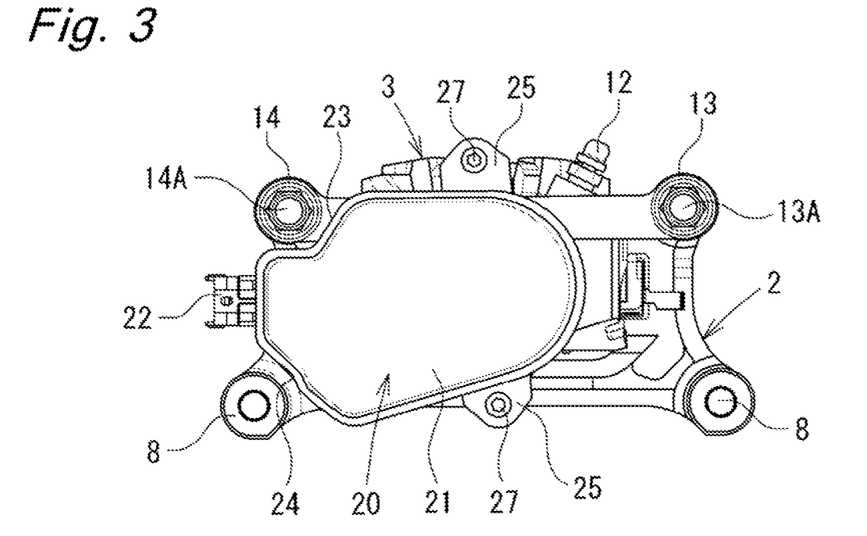
FIG. 3 is a front view or the disk brake illustrated in FIG. 1.
Figure 11:
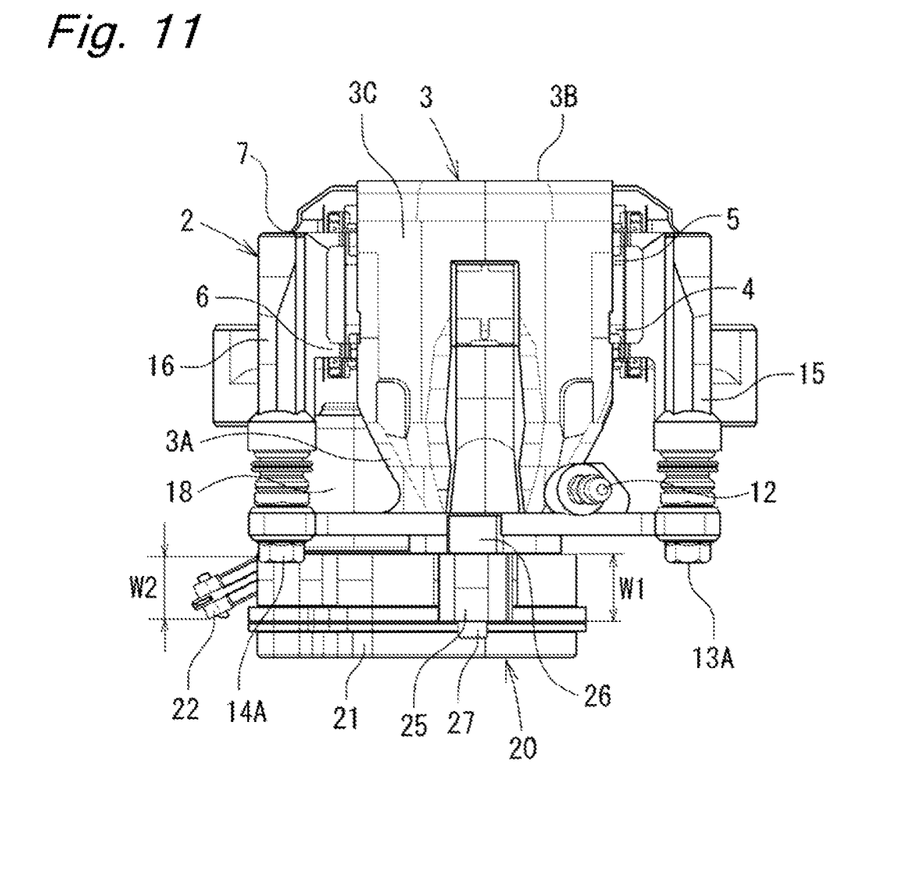
FIG. 11 is a top view illustrating a first modification or the disk brake illustrated in FIG. 1.

FIG. 11 is a top view illustrating the first modification of the disk brake illustrated in FIG. 1. Even if the connector 22 is inclined with respect to the caliper 3 as illustrated in FIG. 11, the effect of the embodiment described above can be achieved as long as the disk brake is formed in such a manner that the distance R1 between the center O of the disk rotor D and the portion of the attachment portion 25 that is located radially farthest away from the center O of the disk rotor D is longer than the distance R2 between the center O of the disk rotor D and the portion of the connector 22 that is located radially farthest away from the center O of the disk rotor D, and that the width W2 of the connector 22 in the axial direction of the disk rotor D falls within the range of the width W1 of the attachment portion 25 in the axial direction of the disk rotor D.

Figure 12:
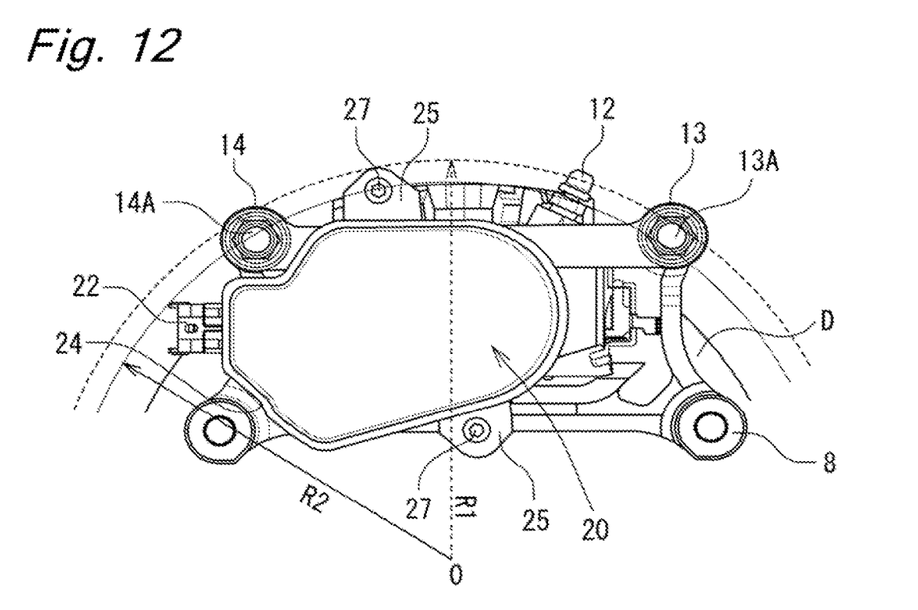
FIG. 12 is a front view illustrating a second modification of the disk brake illustrated in FIG. 1.
Figure 13:
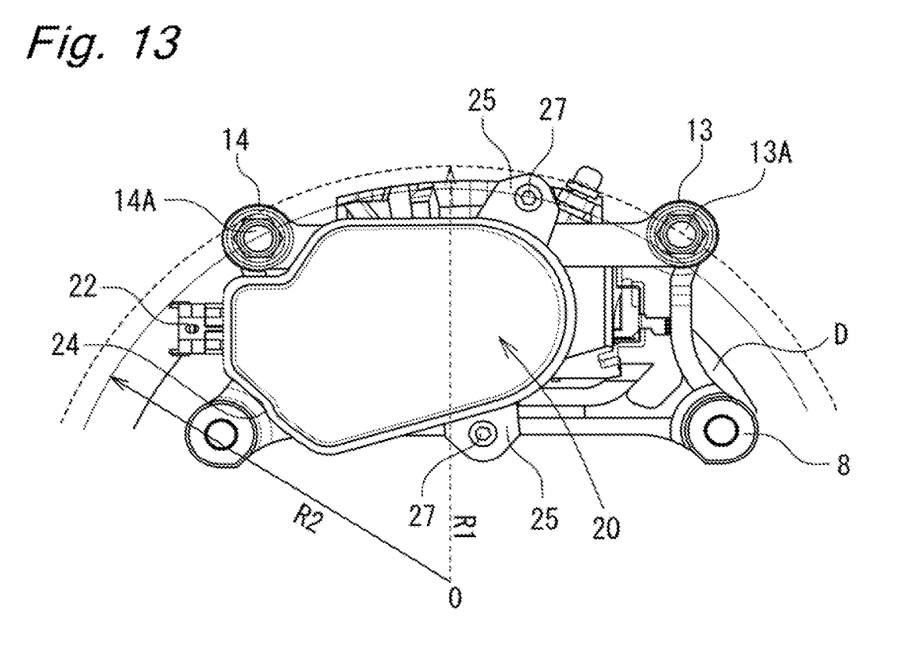
FIG. 13 is a front view illustrating a third modification of the disk brake illustrated in FIG. 1.

FIGS. 12 and 13 are front views illustrating the second and third modifications of the disk brake illustrated in FIG. 1, respectively. Even if the attachment portion 25 is located at a portion closer to the arm portion 14 as illustrated in FIG. 12, or a portion closer to the arm portion 13 as illustrated in FIG. 13, the effect of the embodiment described above can be achieved as long as the disk brake is formed in such a manner that the distance R1 between the center O of the disk rotor D and the portion of the attachment portion 25 that is located radially farthest away from the center O of the disk rotor D is longer than the distance R2 between the center O of the disk rotor D and the portion of the connector 22 that is located radially farthest away from the center O of the disk rotor D, and that the width W2 of the connector 22 in the axial direction of the disk rotor D fails within the range of the width W1 of the attachment portion 25 in the axial direction of the disk rotor D.

The present embodiments have been constructed mainly assuming such a situation that the vehicle is started from the parked state with the ice and snow stuck to the inner circumference of the wheel after the vehicle is parked for a long time in winter. In main cases, the vehicle is advanced after being backed first when being started from the parked state, whereby the disk brake 1 according to the present embodiments is configured in such a manner that the entry side and the exit side in the rotational direction would be located on the right side and the left side as viewed in FIG. 10, respectively, when the vehicle is backed. This configuration allows the attachment portion 25 to receive the ice and snow rotated from the right side in FIG. 10, and thus to fulfill a role as the means for protecting the connector 22 (a guard from the stuck ice). However, in a case where it is assumed that the vehicle is mostly advanced without being backed first when being started from the parked state, the disk brake 1 may be configured to set the rotational direction of the disk brake D in such a manner that the entry side and the exit side in the rotational direction would be located on the right side and the left side as viewed in FIG. 10, respectively, when the vehicle is advanced.

The disk brake according to the above-described embodiments is configured in the following manner. This disk brake includes brake pads disposed opposite of a disk rotor from each other on both sides of the disk rotor, a caliper including a piston configured to press the brake pads against the disk rotor and a driving mechanism configured to drive the piston, and a driving unit disposed in a housing attached to the caliper and including an electric motor and a transmission mechanism configured to transmit a driving force of the electric motor to the driving mechanism. An attachment portion and a connector are protrudingly provided at the housing. The attachment portion is used to attach the housing to the caliper, and the connector is used to supply power to the electric motor. The attachment portion is formed in such a manner that a distance between a center of the disk rotor and a portion of the attachment portion that is located farthest away from the center of the disk rotor in a radial direction is longer than a distance between the center of the disk rotor and a portion of the connector that is located farthest away from the center of the disk rotor in the radial direction, and a width of the connector in an axial direction of the disk rotor falls within a range of a width of one attachment portion in the axial direction of the disk rotor.

Further, this disk brake includes a caliper including a piston configured to press brake pads, which are disposed opposite of the disk rotor from each other on both sides of the disk rotor, against a disk rotor, a driving mechanism disposed at the caliper and configured to drive the piston, a transmission mechanism configured to transmit a driving force of an electric motor to the driving mechanism, and a housing containing the transmission mechanism therein and attached to the caliper. An attachment portion and a connector are provided at the housing. The attachment portion is used to attach the housing to the caliper, and the connector is used to supply power to the electric motor. The attachment portion and the connector are disposed so as to protrude from the housing while being arranged radially along a rotational direction of the disk rotor. An outermost portion of the attachment portion in a radial direction of the disk rotor is located on an outer side in the radial direction with respect to an outermost portion of the connector in the radial direction of the disk rotor.

The attachment portion may be disposed on an entry side in a rotational direction of the disk rotor when a vehicle is backed, with respect to the connector. Further, the attachment portion may protrude from a surface of the housing that is located on an outer side in the radial direction of the disk rotor. Further, the attachment portion may be disposed so as to protrude outwardly in the radial direction beyond a portion of the housing that is located on an outermost side in the radial direction of the disk rotor.

Further, the caliper may include a cylinder main body portion slidably containing the piston configured to press one of the brake pads, a bridge portion extending from the cylinder main body portion over the disk rotor, and a claw portion extending from the bridge portion inwardly in the radial direction of the disk rotor and configured to press the other of the brake pads. The attachment portion may be fixed to a boss portion that protrudes from the cylinder main body portion outwardly in the radial direction of the disk rotor within a range of the cylinder main body portion in the rotational direction of the disk rotor where the bridge portion is disposed.

Further, the caliper may include a cylinder main body portion movably containing the piston therein, an arm portion extending from the cylinder main body portion in a rotational direction of the disk rotor, and a threadably fixable slide pin extending from a distal end side of the arm portion in the axial direction of the disk rotor. The caliper may be supported movably in the axial direction of the disk rotor via the slide pin. The disk brake may further include a carrier including a mounting portion configured to be threadably fixed to a non-rotational portion of a vehicle. A position of the connector in the radial direction of the disk rotor may be located on an inner side in the radial direction with respect to a position of the slide pin in the radial direction of the disk rotor, and located on an outer side in the radial direction with respect to a position of the mounting portion of the carrier in the radial direction of the disk rotor.

The above-described embodiments have been described assuming the use of the electric parking brake, but the embodiments of the present invention may be applied to an electric caliper configured to drive a normal brake by an electric motor. Further, a connector for a sensor such as a temperature sensor may be disposed at a similar position to the connector for driving, instead of the connector for driving.

Having described several embodiments of the present invention, the above-described embodiments of the invention are intended to facilitate understanding of the present invention, and are not intended to limit the present invention. Needless to say, the present invention can be modified or improved without departing from the scope and the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under 35 U.S.C. section 119 to Japanese Patent Application No. 2014-182327, filed on Sep. 8, 2014. The entire disclosure of Japanese Patent Application No. 2014-182327, filed on Sep. 8, 2014 including the specification, the claims, the drawings, and the abstract is incorporated herein by reference in its entirety.

What is claimed is:

1. A disk brake comprising:
    brake pads disposed opposite of a disk rotor from each other on both sides of the disk rotor;
    a caliper including a piston configured to press the brake pads against the disk rotor, and a driving mechanism configured to drive the piston; and
    a driving unit disposed in a housing attached to the caliper, the driving unit including an electric motor, and a transmission mechanism configured to transmit a driving force of the electric motor to the driving mechanism,
    wherein an attachment portion and a connector are protrudingly provided at the housing, the attachment portion being used to attach the housing to the caliper, the connector being used to supply power to the electric motor,
    wherein the attachment portion and the connector are both in a same plane orthogonal to an axis, if extended, of the disk rotor, in an operational position of the disk brake, and
    wherein the attachment portion is formed in such a manner that, in the operational position of the disk brake, a distance between the axis of the disk rotor and a portion of the attachment portion that is located farthest away from the axis of the disk rotor in a radial direction is longer than a distance between the axis of the disk rotor and a portion of the connector that is located farthest away from the axis of the disk rotor in the radial direction, and that a width of the connector in an axial direction of the disk rotor falls within a range of a width of the attachment portion in the axial direction of the disk rotor.

2. The disk brake according to claim 1, wherein the attachment portion, in the operational position of the disk brake, is disposed on an entry side in a rotational direction of the disk rotor when a vehicle is backed, with respect to the connector.

3. The disk brake according to claim 1, wherein the attachment portion, in the operational position of the disk brake, protrudes from a surface of the housing that is located on an outer side in the radial direction of the disk rotor.

4. The disk brake according to claim 3, wherein the attachment portion, in the operational position of the disk brake, is disposed so as to protrude outwardly in the radial direction beyond a portion of the housing that is located on an outermost side in the radial direction of the disk rotor.

5. The disk brake according to claim 1, wherein the caliper includes a cylinder main body portion moveably containing the piston configured to press one of the brake pads, a bridge portion extending from the cylinder main body portion over the disk rotor, and a claw portion extending from the bridge portion inwardly in the radial direction of the disk rotor and configured to press the other of the brake pads, and
    wherein the attachment portion, in the operational position of the disk brake, is fixed to a boss portion, the boss portion protruding from the cylinder main body portion outwardly in the radial direction of the disk rotor within a range of the cylinder main body portion in the rotational direction of the disk rotor where the bridge portion is disposed.

6. The disk brake according to claim 1, wherein the caliper includes a cylinder main body portion movably containing the piston therein, an arm portion extending from the cylinder main body portion in a rotational direction of the disk rotor, and a threadably fixable slide pin extending from a distal end side of the arm portion in the axial direction of the disk rotor,
- wherein the caliper is supported movably in the axial direction of the disk rotor via the slide pin,
- wherein the disk brake further includes a carrier including a mounting portion configured to be threadably fixed to a non-rotational portion of a vehicle, and
- wherein a position of the connector in the radial direction of the disk rotor is located on an inner side in the radial direction with respect to a position of the slide pin in the radial direction of the disk rotor, and is located on an outer side in the radial direction with respect to a position of the mounting portion of the carrier in the radial direction of the disk rotor.

7. A disk brake comprising:
- a caliper including a piston configured to press brake pads against a disk rotor, the brake pads being disposed opposite of the disk rotor from each other on both sides of the disk rotor;
- a driving mechanism disposed at the caliper and configured to drive the piston;
- a transmission mechanism configured to transmit a driving force of an electric motor to the driving mechanism; and
- a housing containing the transmission mechanism therein and attached to the caliper,
- wherein an attachment portion and a connector are provided at the housing, the attachment portion being used to attach the housing to the caliper, the connector being used to supply power to the electric motor,
- wherein the attachment portion and the connector are disposed so as to protrude from the housing while being arranged radially along a rotational direction of the disk rotor and in a same plane orthogonal to an axis, if extended, of the disk rotor, in an operational position of the disk brake, and
- wherein an outermost portion of the attachment portion in a radial direction of the disk rotor is located on an outer side in the radial direction with respect to an outermost portion of the connector in the radial direction of the disk rotor.

8. The disk brake according to claim 7, wherein the attachment portion, in the operational position of the disk brake, is disposed on an entry side in the rotational direction of the disk rotor when a vehicle including the disk brake is backed up, with respect to the connector.

9. The disk brake according to claim 7, wherein the attachment portion, in the operational position of the disk brake, protrudes from a surface of the housing that is located on an outer side in the radial direction of the disk rotor.

10. The disk brake according to claim 9, wherein the attachment portion, in the operational position of the disk brake, is disposed so as to protrude outwardly in the radial direction beyond a portion of the housing that is located on an outermost side in the radial direction of the disk rotor.

11. The disk brake according to claim 7, wherein the caliper includes a cylinder main body portion moveably containing the piston configured to press one of the brake pads, a bridge portion extending from the cylinder main body portion over the disk rotor, and a claw portion extending from the bridge portion inwardly in the radial direction of the disk rotor and configured to press the other of the brake pads, and
- wherein the attachment portion, in the operational position of the disk brake, is fixed to a boss portion, the boss portion protruding from the cylinder main body portion outwardly in the radial direction of the disk rotor within a range of the cylinder main body portion in the rotational direction of the disk rotor where the bridge portion is disposed.

12. The disk brake according to claim 7, wherein the caliper includes a cylinder main body portion movably containing the piston therein, an arm portion extending from the cylinder main body portion in the rotational direction of the disk rotor, and a threadably fixable slide pin extending from a distal end side of the arm portion in an axial direction of the disk rotor,
- wherein the caliper is supported movably in the axial direction of the disk rotor via the slide pin,
- wherein the disk brake further includes a carrier including a mounting portion configured to be threadably fixed to a non-rotational portion of a vehicle, and
- wherein a position of the connector in the radial direction of the disk rotor is located on an inner side in the radial direction with respect to a position of the slide pin in the radial direction of the disk rotor, and is located on an outer side in the radial direction with respect to a position of the mounting portion of the carrier in the radial direction of the disk rotor.

13. A disk brake comprising:
- brake pads disposed opposite of a disk rotor from each other on both sides of the disk rotor;
- a caliper configured to press the brake pads against the disk rotor; and
- a housing attached to the caliper,
- wherein an attachment portion and a connector are protrudingly provided at the housing, the attachment portion being used to attach the housing to the caliper, the connector being used to establish an electric connection,
- wherein the attachment portion and the connector are both in a same plane orthogonal to an axis, if extended, of the disk rotor, in an operational position of the disk brake, and
- wherein the attachment portion is formed in such a manner that, in the operational position of the disk brake, a distance between the axis of the disk rotor and a portion of the attachment portion that is located farthest away from the axis of the disk rotor in a radial direction is longer than a distance between the axis of the disk rotor and a portion of the connector that is located farthest away from the axis of the disk rotor in the radial direction, and that a width of the connector in an axial direction of the disk rotor falls within a range of a width of the attachment portion in the axial direction of the disk rotor.

14. The disk brake according to claim 13, wherein the attachment portion, in the operational position of the disk brake, is disposed on an entry side in a rotational direction of the disk rotor when a vehicle is backed, with respect to the connector.

15. The disk brake according to claim 13, wherein the attachment portion, in the operational position of the disk brake, protrudes from a surface of the housing that is located on an outer side in the radial direction of the disk rotor.

16. The disk brake according to claim 15, wherein the attachment portion, in the operational position of the disk brake, is disposed so as to protrude outwardly in the radial direction beyond a portion of the housing that is located on an outermost side in the radial direction of the disk rotor.

17. The disk brake according to claim 13, wherein the caliper includes a cylinder main body portion moveably containing the piston configured to press one of the brake pads, a bridge portion extending from the cylinder main body portion over the disk rotor, and a claw portion extending from the bridge portion inwardly in the radial direction of the disk rotor and configured to press the other of the brake pads, and wherein the attachment portion, in the operational position of the disk brake, is fixed to a boss portion, the boss portion protruding from the cylinder main body portion outwardly in the radial direction of the disk rotor within a range of the cylinder main body portion in the rotational direction of the disk rotor where the bridge portion is disposed.

18. The disk brake according to claim 13, wherein the caliper includes a cylinder main body portion movably containing the piston therein, an arm portion extending from the cylinder main body portion in a rotational direction of the disk rotor, and a threadably fixable slide pin extending from a distal end side of the arm portion in the axial direction of the disk rotor, wherein the caliper is supported movably in the axial direction of the disk rotor via the slide pin, wherein the disk brake further includes a carrier including a mounting portion configured to be threadably fixed to a non-rotational portion of a vehicle, and wherein a position of the connector in the radial direction of the disk rotor is located on an inner side in the radial direction with respect to a position of the slide pin in the radial direction of the disk rotor, and is located on an outer side in the radial direction with respect to a position of the mounting portion of the carrier in the radial direction of the disk rotor.

* * * * *